Figure 1:
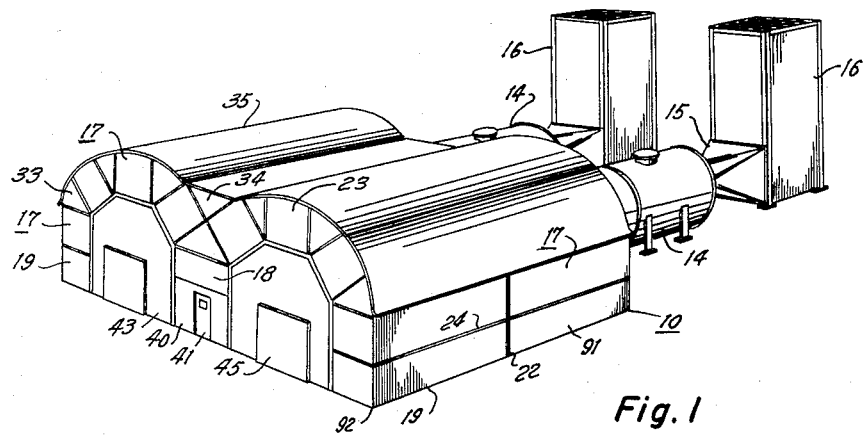

July 8, 1958 M. G. HUGHETT 2,842,222
ACOUSTICAL TEST CELL STRUCTURES
Filed Sept. 14, 1954 5 Sheets-Sheet 1

INVENTOR
Maurice G. Hughett

BY

ATTORNEYS

July 8, 1958

M. G. HUGHETT 2,842,222

ACOUSTICAL TEST CELL STRUCTURES

Filed Sept. 14, 1954

5 Sheets-Sheet 2

INVENTOR
Maurice G. Hughett

BY

ATTORNEYS

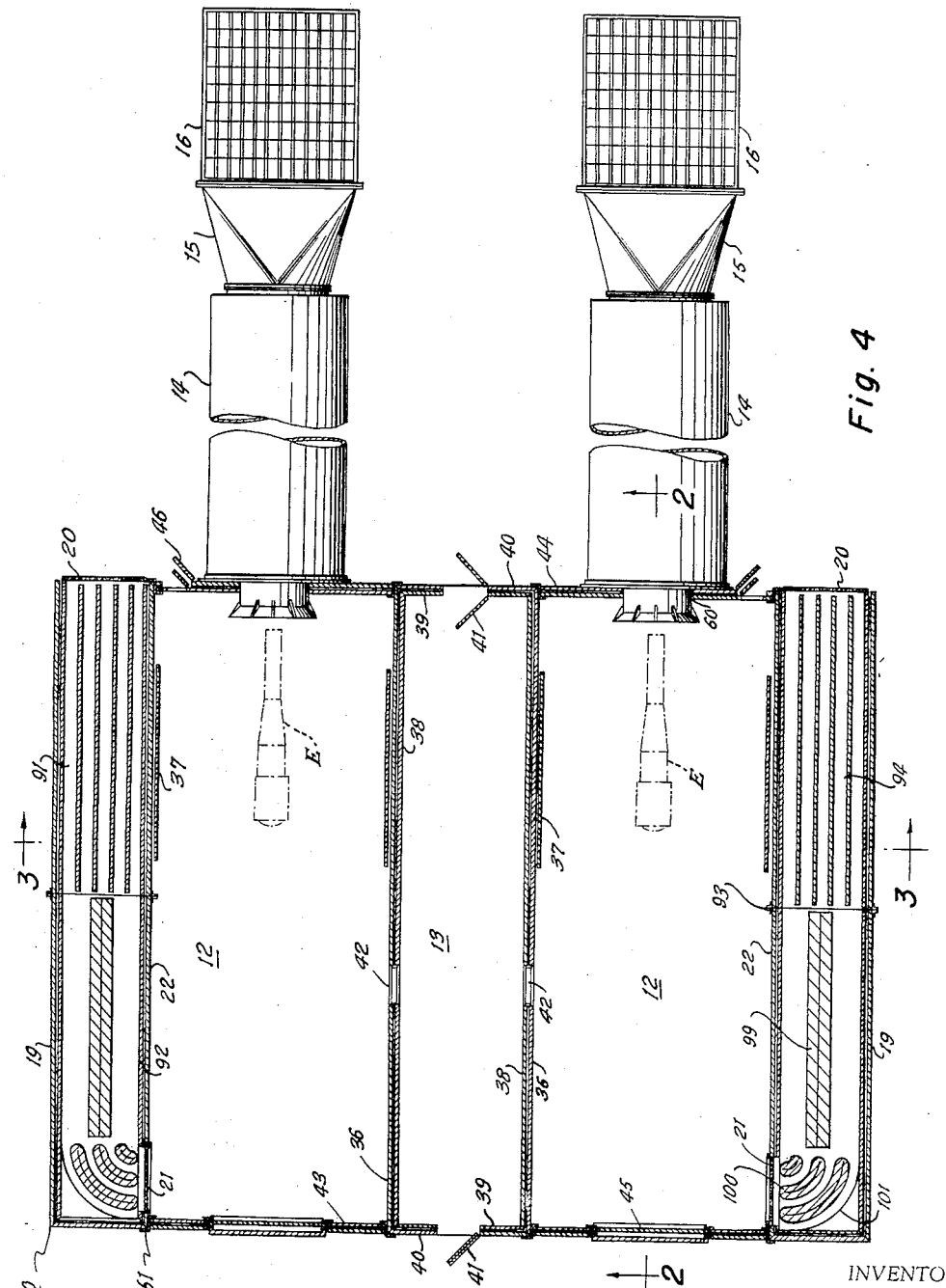

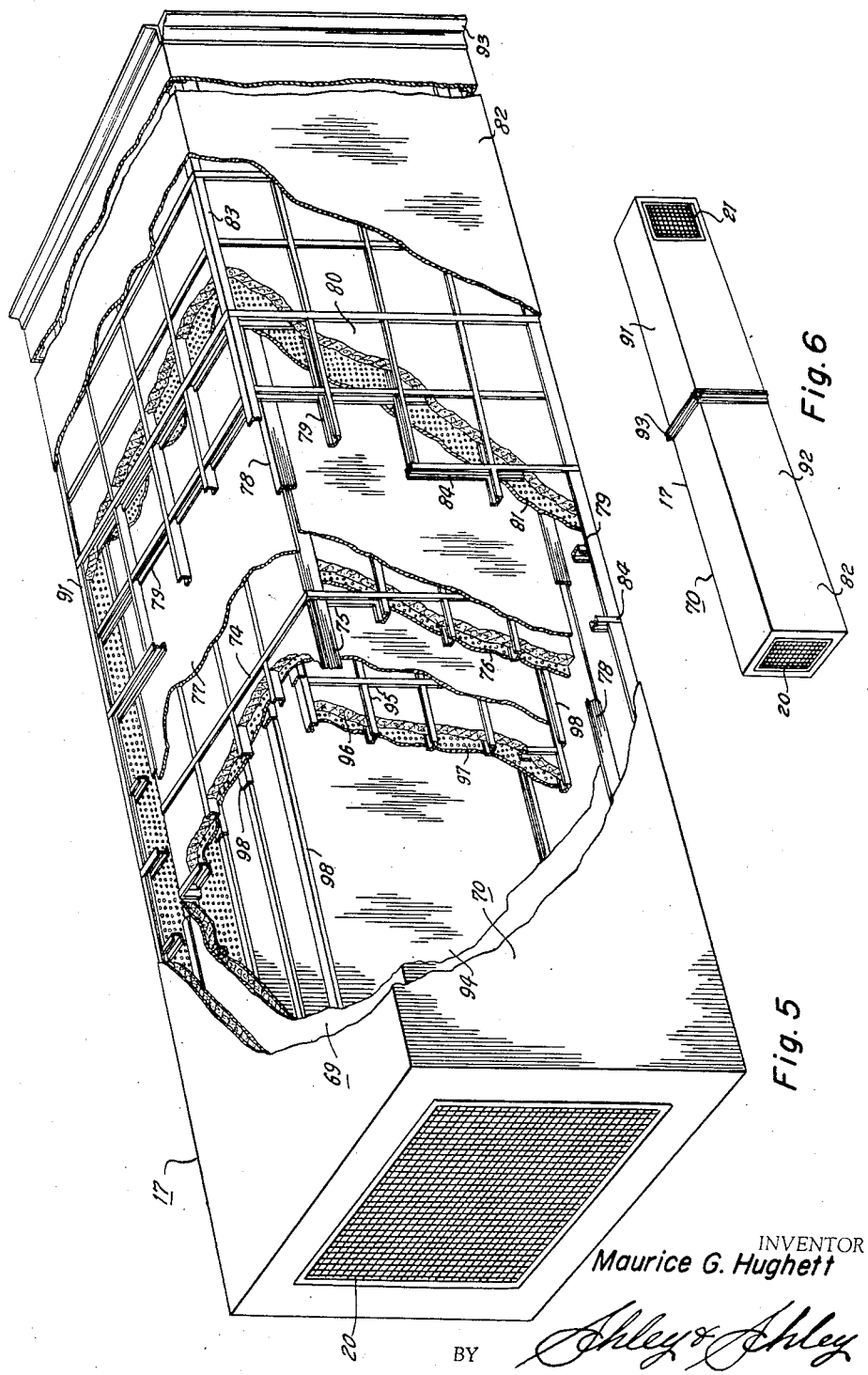

July 8, 1958 M. G. HUGHETT 2,842,222
ACOUSTICAL TEST CELL STRUCTURES
Filed Sept. 14, 1954 5 Sheets-Sheet 5

INVENTOR
Maurice G. Hughett
BY Ashley & Ashley
ATTORNEYS

United States Patent Office 2,842,222
Patented July 8, 1958

2,842,222
ACOUSTICAL TEST CELL STRUCTURES
Maurice G. Hughett, Dallas, Tex., assignor to Burnett Estes, Dallas, Tex.

Application September 14, 1954, Serial No. 455,871
11 Claims. (Cl. 181—42)

This invention relates to new and useful improvements in acoustical test cell structures and more particularly to prefabricated test cell structures.

One object of the invention is to provide an improved structure having an acoustical cell for testing jet and other aircraft engines in the usual manner and having acoustical means of such construction and arrangement as to be capable of being prefabricated for assembly.

An important object of the invention is to provide an improved acoustical test cell structure having prefabricated air intake means adapted to be assembled to form the side and top walls of the structure, the means being of acoustical construction so as to sound insulate said walls.

A particular object of the invention is to provide an improved prefabricated test cell structure, of the character described, wherein the air intake means is prefabricated and detachably connected for ready assembly and disassembly whereby the structure may be readily erected and dismantled as well as transported.

Another object of the invention is to provide an improved prefabricated test cell structure, of the character described, having acoustical end wall panels mounted for outward displacement in response to excessive internal pressures caused by explosions within the cell so as to prevent destruction of the structure and its inlet ducts.

A further object of the invention is to provide an improved structure, of the character described, wherein prefabricated air ducts are arranged to form a pair of spaced test cells with a control room therebetween, the ducts forming the outer side walls and a portion of the inner side walls of the cells as well as the top walls of the room and cells with acoustical panels forming the walls of said room and supporting said ducts at said inner walls of said cells.

An object of the invention is to provide an improved air duct for a test cell structure having a pair of nested tubes of acoustical construction and acoustically insulated from one another to prevent the direct transmission of sound from the inner tube to the outer tube.

Another object of the invention is to provide an improved air duct for a test cell structure having external walls formed by spaced acoustical panels acoustically insulated from each other with internal acoustical panels extending longitudinally in spaced relation to the walls and each other, the internal panels being arranged to absorb high and low frequency sound.

A construction designed to carry out the invention will be hereinafter described, together with other features of the invention.

Figure 2:
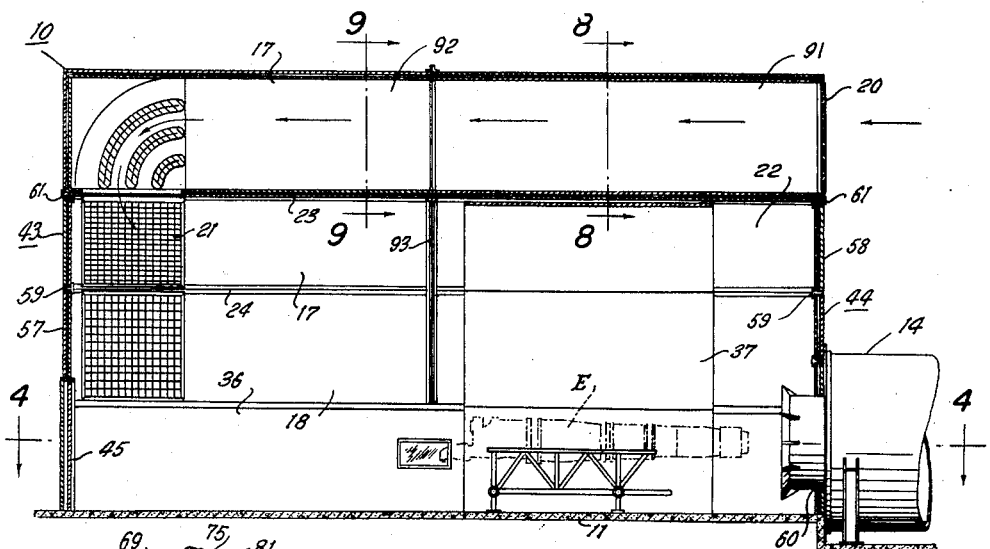
Figure 12:
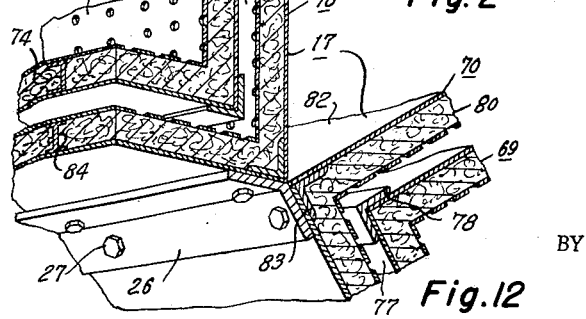
Figure 3:
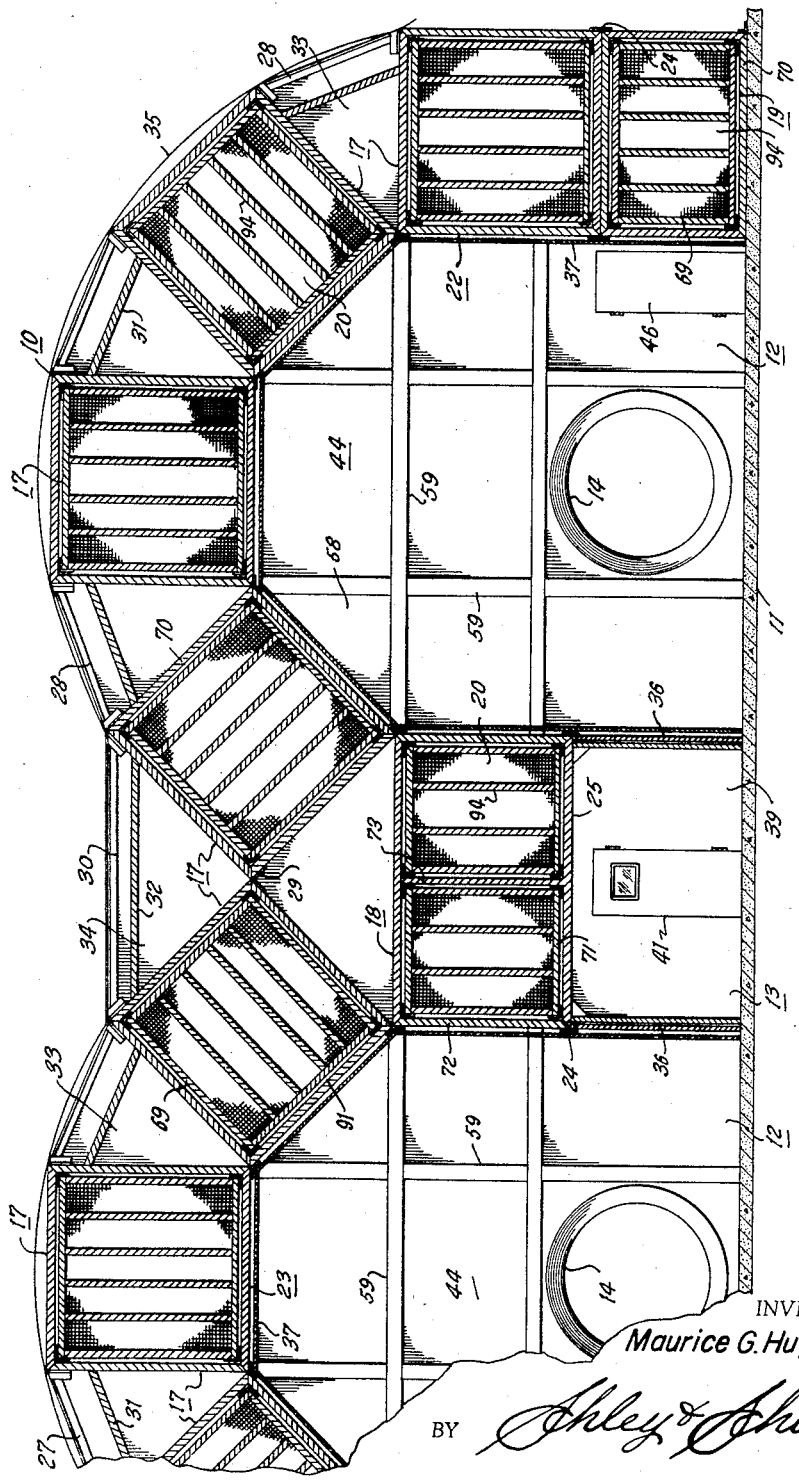
Figure 7:
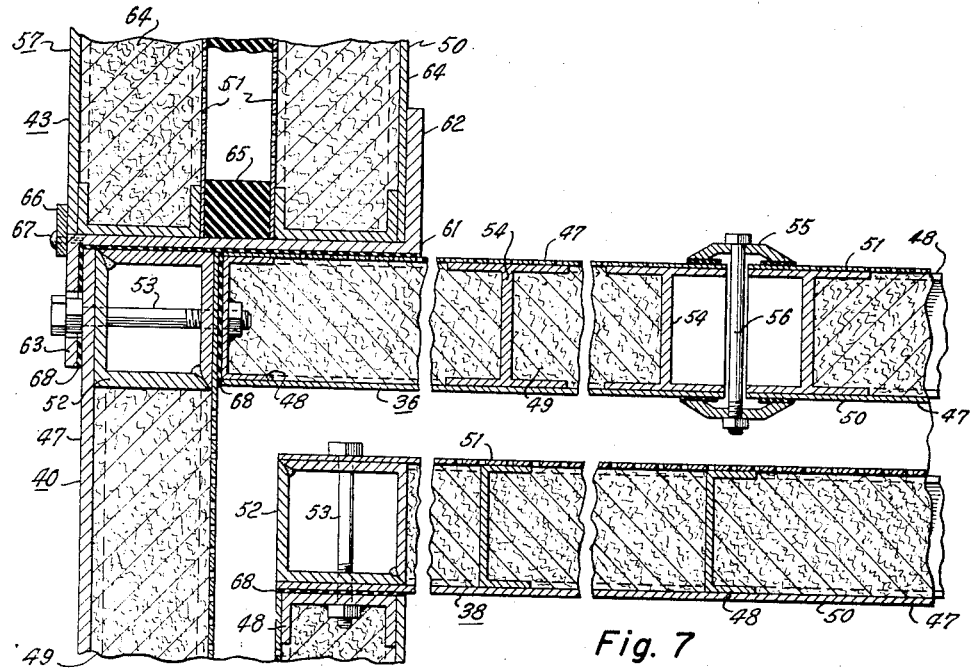
Figures 8, 9:
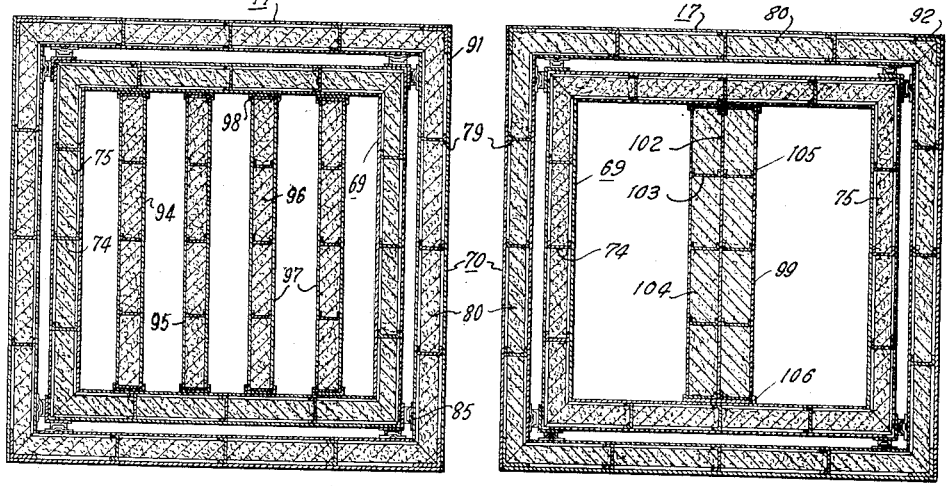
Figures 10, 11:
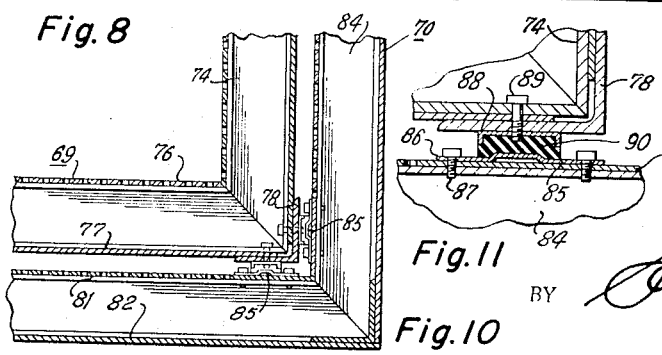

The invention will be more readily understood from a reading of the following specification and by reference to the accompanying drawings, wherein an example of the invention is shown, and wherein:

Fig. 1 is a perspective view of a prefabricated test cell structure constructed in accordance with the invention and connected to exhaust silencers, Fig. 2 is a longitudinal, vertical, sectional view, taken on the line 2—2 of Fig. 4, Fig. 3 is a transverse, vertical, sectional view, taken on the line 3—3 of Fig. 4, Fig. 4 is a horizontal, cross-sectional view, taken on the line 4—4 of Fig. 2, and showing the exhaust silencers, Fig. 5 is an enlarged perspective view, partly in section, of one section of one of the air ducts, Fig. 6 is a reduced, perspective view of one of the air ducts, Fig. 7 is an enlarged, horizontal, cross-sectional view, showing the relation of the adjacent walls of the control room and one of the test cells and the mounting of one of the blowout panels, Fig. 8 is a transverse, vertical, sectional view of the high frequency section of one of the ducts, taken on the line 8—8 of Fig. 2, Fig. 9 is a view, similar to Fig. 8, of the low frequency section, taken on the line 9—9 of Fig. 2, Fig. 10 is an enlarged, transverse, vertical, sectional view of one corner of one of the ducts showing the construction of its external walls with the sound absorbing material being removed, Fig. 11 is an additionally enlarged, sectional view showing the mounting between the inner and outer tubes or panels of the duct walls, and Fig. 12 is an enlarged, perspective, sectional view showing a typical connection between adjacent ducts.

In the drawings, the numeral 10 designates a rectangular structure or building mounted on a suitable foundation 11 and having a pair of spaced, preferably parallel test cells 12 with a common control room 13 therebetween (Fig. 4). An exhaust silencer 14 connected by a transition 15 to an upright, exhaust stack 16 is provided for each test cell 12, the silencer and stack being of conventional acoustical construction and forming no part of the present invention. The structure includes a plurality of elongated, air intake members or ducts 17, 18 and 19 having screened influent openings 20 at one end and screened effluent openings 21 in their side walls at their opposite ends (Figs. 2, 4 and 6). Preferably, the air ducts are rectangular in cross-section and prefabricated for assembly in horizontal, parallel relation to form the exterior side and top walls 22 and 23 of the cells. As shown in Fig. 3, the cross-sectional dimensions of the ducts differ with the ducts 17 being substantially equilateral, the ducts 18 and 19 being of greater width than height and of less height than said ducts 17, and said duct 18 being of greater width than said ducts 17 and 19.

Each exterior side wall 22 is formed by one of the ducts 17 resting upon one of the ducts 19 and connected thereto by substantially coextensive, flat bars 24 overlying the adjacent longitudinal margins of said ducts. As will be apparent, the duct 18 is disposed between the exterior side walls in overlying relation to the control room 13 so as to provide a top wall 25 therefor. Each top wall 23 is arched and formed by at least three of the ducts 17 with the outermost ducts being disposed at acute angles to the intermediate duct of said wall, the uppermost duct of the side wall and the duct 18. As shown in Fig. 12, substantially coextensive, angle bars 26 overlie and connect the abutting longitudinal margins of the ducts 17 and 18 and bolts 27 are provided for detachably fastening the bars to said ducts. The outer longitudinal margins of the ducts 17 are spaced from each other and connected by angular brackets 28 extending transversely between said margins. It is noted that the ducts 17 at the inner margins of the top walls 23 overlie the duct 18 in right angular relation to each other and have their abutting longitudinal margins connected by a substantially coextensive, right angular bar 29. An angular bracket 30, similar to the bars 28, connects the outer longitudinal margins of the latter ducts in spaced relation. Internally of the brackets 28 and 30, acoustical, longitudinal panels 31 and 32 extend between and throughout the length of the ducts 17 and upright, triangular, acoustical panels 33 and 34 close the ends of the spaces between the longitudinal panels and ducts. A sheet metal roof 35 overlies the ducts 17, brackets 28 and 30 and panels 31 and 32 of the top walls 23.

An upright, acoustical wall 36 underlies and is coextensive with each lower longitudinal margin of the duct 18 for supporting the same and providing inner walls for the cells 12, being connected to said duct by the flat bars 24 (Figs. 2, 3 and 4). Preferably, armor plates 37 overlie the inner surfaces of the walls of the cells around the engines E, shown in broken lines. The control room has acoustical, upright, side walls 38 in spaced relation to the inner walls 36 of the cells and similar inner end walls 39 in spaced relation to similar, outer end walls 40 secured to said walls 36 and the ends of the duct 18, whereby an air space is provided between said walls for sound attenuation. Suitable doors 41 are mounted in the end walls 39 and 40 and the side walls 36 and 38 may have observation windows 42. As will be explained, front and rear walls 43 and 44 are provided at the ends of the cells and are mounted for outward displacement in response to excessive internal pressure caused by explosions in said cells. An access door 45 is mounted in each front wall 43, while the rear walls have escape doors 46.

Each of the walls 36, 38, 39 and 40 include one or more upright panels 47 of cellular construction having intersecting, upright and transverse channel members 48 at their margins and at spaced intervals therebetween for supporting suitable sound insulating material 49 (Fig. 7). Coextensive sheathing, in the form of thin, metallic plates or sheets 50 and 51, overlies and is secured to the channel members 48 to confine the material therebetween. It is noted that the outer plates 50, which are farthest from the cells or source of sound, are solid and relatively thick for resisting the transmission of sound, while the inner sheets 51, which are closest to said cells or sound source, are foraminous and relatively thin for admitting sound waves to the material. Upright box beams or frame members 52 are provided at the outer ends of the end panels 47 of the walls 38 and 40 and are adapted to overlie and be fastened by bolts and nuts 53 to the upright channel members 48 at the outer ends of the end panels of the walls 39 and 36, respectively. The inner side walls 36 are slightly different from the other walls in that upright I-beams or support members 54 are provided at spaced intervals between and at the ends of the panels except at the outer ends of the end panels, one of the channel members being positioned at each of said ends for connection with the box beam of each end wall 40. The marginal I-beams 54 of adjacent panels are contiguous and frictionally fastened together by a pair of overlying clamp bars or elements 55 and bolts and nuts 56.

Although the front end wall 43 of each cell 12 may include one or more panels 57, each rear wall preferably has a plurality of panels 58 of rectangular and triangular shape supported by upright and transverse T-bars or frame members 59 having their heads directed inwardly (Figs. 2 and 3). As shown by the numeral 60, the lowermost, intermediate panel 58 has an opening for receiving the inner end of the silencer 14. A marginal frame member or Z-bar 61, conforming to the internal, cross-sectional contour of the cells, is provided for supporting the panels and T-bars 58 of each end wall (Figs. 2, 4 and 7). The Z-bars overlie the inner side walls 36 with their inner flanges 62 directed transversely inward of the cells and their outer flanges 63 extending laterally in overlying relation and suitably secured to the box beams 52 of the outer end walls 40 and the ends of their ducts 17, 18 and 19. Since the Z-bars 61 conform to the contour of the cells, it is apparent that said Z-bars function as frame members for connecting and supporting the walls and ducts. The panels 57 and 58 include a pair of acoustical panels 64, substantially identical to the panels 47, held in spaced relation by a peripheral pad or element 65 of rubber or other sound insulating material. It is noted that the solid plates 50 of the panels 64 are positioned at the exteriors of the end walls 43 and 44 and that the foraminous sheets 51 are disposed internally in adjacent relation whereby said walls are reversible. For removably confining the end walls within the Z-bars in engagement with the inner flanges 62, suitable clips or flat bars 66 are detachably secured to the flanges 63 by frictional fasteners 67 in overlying relation to the perimeters of said walls. Manifestly, this mounting permits outward movement of the end walls to relieve excessive internal pressure due to explosions in the cells. Preferably, rubber or other sound insulating material 68 is interposed between the junctures of the walls 36, 38, 39 and 40 and around the Z-bars.

With exception of their cross-sectional dimensions, the ducts 17 and 19 are identical and include inner and outer tubes or members 69 and 70 telescoped or nested one within the other in spaced relation so as to form acoustical walls for said ducts. The duct 18 is very similar and includes a pair of inner tubes 71 nested in side-by-side relation within an outer tube 72 and separated by an intermediate, upright panel or partition 73 (Fig. 3). Each duct has its influent opening 20 communicating with the atmosphere at the rear end of the structure 10, while its effluent opening 20 is in communication with the front end of its cell 12 for directing air thereinto. Since the duct 18 is common to both cells, it has a pair of influent and effluent openings whereby one of the tubes 72 communicates with one of the cells and the other tube with the other cell. As most clearly shown in Figs. 5, 8 and 9-12, the tubes are of acoustical, cellular construction similar to the walls 36, 38, 39 and 40 and their walls or panels are similar to the panels 47 and 64. Intersecting channel members 74 extend longitudinally and circumferentially of the inner tubes 69 and 71 for supporting sound absorbing material 75, and metallic sheathing, in the form of inner foraminous sheets 76 and outer solid plates 77, overlies the inner and outer surfaces of the members to confine the material therebetween. The margins of the inner tubes are reinforced by external, longitudinal angle bars 78. Although not shown in detail, the inner ends of the tubes are of the same construction.

The outer tubes 70 and 72 are similar and include similar longitudinal and circumferential channel members 79, sound absorbing material 80, sheathing or inner and outer sheets or plates 81 and 82 and internal, longitudinal angle bars 83 between said members and sheathing for reinforcing the margins of said tubes. For supporting the weight of the duct, circumferential I-beams or frame members 84 are provided at spaced intervals, preferably alternately with the channel members, and in alignment with the I-beams 54 of the inner side walls 36 shown in Fig. 7. The inner and outer tubes are spaced from each other by a plurality of shock mounts 85 interposed therebetween on each side of each corner, and, preferably, between the external angle bars 78 of the inner tubes and the I-beams 84 of the outer tubes. Each shock mount includes a base plate 86 fastened by bolts 87 to the I-beam, a cap plate 88 secured to the angle bar by a bolt 89 and a pad 90, of rubber or other suitable material, confined between and bonded to the plates (Figs. 10 and 11). Manifestly, the spaced relation provided by the shock mounts 85 prevents the direct transmission of sound waves or vibrations from the inner to the outer tubes. Of course, the openings 20 and 21 are formed in both tubes.

Each air duct includes a high frequency section 91 adjacent its influent opening and a low frequency section 92 adjacent its effluent opening with the sections being connected by angle bars 93 extending around the contiguous ends of their outer tubes (Figs. 4-6). A plurality of sound attenuation units or acoustical panels 94 extend longitudinally substantially throughout the length of the low frequency section in spaced, parallel relation and preferably uprightly as shown in Figs. 3–5 and 8. The panels are of cellular construction, similar to the panels 47 and 64, and include similar, intersecting, longitudinal and transverse channel members 95 at their margins and at suitably spaced intervals therebetween for supporting sound absorbing material 96. Foraminous, metallic sheets or sheathing 97 cover the outer faces or sides of the panels 94 to confine the material and said panels may be held in spaced relation by U-shaped brackets or channel members 98 secured to opposite walls of the inner tube and extending longitudinally thereof.

Preferably, the high frequency section 92 has a single, upright, sound attenuation unit or acoustical panel 99 medially between its side walls and extending longitudinally from its influent or connected end to a point adjacent its effluent opening 21. For directing the air through the opening, a plurality of arcuate sound attenuation units or acoustical panels 100 are disposed between the panel 99 and said opening in upright, spaced relation to each other and an arcuate turn baffle 101 is mounted in the corner of the tube opposite said opening (Figs. 4 and 9). Each of the panels 99 and 100 is similar to the panels 94 and includes an upright, solid, metallic partition or plate 102 coextensive therewith at its center line. Intersecting, longitudinal and transverse channel members 103 are provided at the margins of each panel and spaced intervals therebetween on each side of the partition 102 for supporting sound absorbing material 104, which is confined by overlying cover sheets or sheathing 105 of foraminous metal. The panels may be held in place by brackets 106, similar to the brackets 98.

It is noted that the sound absorbing material is substantially chemically inert, non-hygroscopic, incombustible, shock resistible, fibrous material, such as glass fibers, uniformly filling the space between the channel or frame members and the sheathing and is compacted to the desired density. Manifestly, the material filters sound waves passing transversely or longitudinally therethrough. As has been pointed out, the test cell structure may be readily assembled and disassembled and component parts transported between the places of manufacture and installation. The ducts and panels of the walls are adapted to be prefabricated to facilitate handling thereof and erection of the structure. Although of relatively simple construction, each duct and wall is of double panel construction with air spaces between the panels for increased sound attenuation. The ducts provide thick side and top walls for the cells and the air passing inwardly through said ducts tends to reverse the outward travel of the sound waves so as to prolong the contact thereof with the sound absorbing material. Since acoustical air ducts are essential, economy of construction is obtained by employing said ducts to form acoustical walls for the test cell structure.

The foregoing description of the invention is explanatory thereof and various changes in the size, shape and materials, as well as in the details of the illustrated construction may be made, within the scope of the appended claims without departing from the spirit of the invention.

What I claim and desire to secure by Letters Patent is:

1. An acoustical test cell structure including a test cell having acoustical end walls, a plurality of air intake ducts disposed in adjacent parallel relation and supported one upon the other to form side and top acoustical walls for the cell, each duct being formed independently of the other ducts and having a passage establishing communication between the exterior and interior of said cell, and means connecting the adjacent margins of said ducts.

2. An acoustical test cell structure as set forth in claim 1 wherein the end walls are mounted for outward displacement in the event of excessive pressure within the test cell.

3. An acoustical test cell structure as set forth in claim 1 wherein each duct includes a pair of acoustical tubes nested one within the other in spaced relation.

4. An acoustical test cell structure as set forth in claim 1 wherein each end wall includes a pair of acoustical panels in parallel spaced relation, each duct including a pair of circumferential acoustical walls in parallel spaced relation.

5. An acoustical test cell structure including acoustical end, side and top walls enclosing a test cell, a plurality of elongated air intake ducts extending longitudinally of the cell in adjacent parallel relation and supported one upon the other to form the side and top walls of said cell, each duct being formed independently of the other ducts and having a separate passage establishing communication between the exterior and interior of the cell, and means connecting the adjacent margins of said ducts.

6. An acoustical test cell structure as set forth in claim 5 including frame members at the ends of the test cell for supporting the end walls, said end walls being removably mounted on the frame members for outward displacement in the event of excessive pressure within said cell.

7. An acoustical test cell structure as set forth in claim 5 wherein each duct includes a pair of acoustical tubes telescoped one within the other in spaced relation to provide an air space therebetween for sound attenuation.

8. An acoustical test cell structure as set forth in claim 5 wherein each wall includes a pair of acoustical panels in spaced parallel relation to provide an air space between the panels for sound attenuation.

9. An acoustical test cell structure including acoustical walls forming a pair of test cells with a control room therebetween, a plurality of elongated air intake ducts extending longitudinally of the structure in adjacent parallel relation and supported one upon the other to form the top walls of the cells and room and the exterior side walls of said cells, the ducts being fabricated independently of each other and having separate passages establishing communication between the exterior and interior of said cells, and means connecting the adjacent margins of said ducts.

10. In an acoustical test cell structure, an air intake duct including a pair of elongated acoustical tubes nested one within the other, and shock mounts disposed between and maintaining the tubes in spaced relation, each tube including a circumferential wall having intersecting frame members, internal foraminous sheathing, external solid sheathing, and sound-absorbing material supported by the frame members and confined between the sheathings.

11. An acoustical test cell structure including acoustical walls enclosing a test cell, a plurality of air intake ducts disposed in adjacent parallel relation and supported one upon the other to form certain of the walls, each duct being formed independently of the other ducts and having a passage establishing communication between the exterior and interior of the cell, means connecting the adjacent margins of said ducts, each duct including a pair of acoustical circumferential walls in parallel spaced relation, and sound attenuation panels extending longitudinally within each duct in parallel spaced relation.

References Cited in the file of this patent

UNITED STATES PATENTS

| | | |
|---|---|---|
| 1,916,908 | Stacey et al. | July 4, 1933 |
| 2,270,825 | Parkinson et al. | Jan. 20, 1942 |
| 2,519,160 | Tucker | Aug. 15, 1950 |
| 2,674,336 | Lemmerman | Apr. 6, 1954 |
| 2,691,426 | Sebok et al. | Oct. 12, 1954 |
| 2,720,276 | Droeger | Oct. 11, 1955 |